United States Patent [19]

Barban

[11] Patent Number: 5,730,208

[45] Date of Patent: Mar. 24, 1998

[54] BIOTHERMAL AND GEOTHERMAL HEAT EXCHANGE APPARATUS FOR A GROUND SOURCE HEAT PUMP

[76] Inventor: Reno L. Barban, Bldg 11, Apt. 307, 498 S. Youngfield, Lakewood, Colo. 80228

[21] Appl. No.: 401,600

[22] Filed: Mar. 9, 1995

[51] Int. Cl.⁶ ................................................ F28D 1/00
[52] U.S. Cl. .......................... 165/45; 165/906; 62/238.7; 62/260; 210/532.2
[58] Field of Search .................. 62/260, 238.7, 62/238.6, 238.1; 165/45, 109.1, 906, 166, 47; 210/187; 237/2.8

[56] References Cited

U.S. PATENT DOCUMENTS

| | | | |
|---|---|---|---|
| 1,969,187 | 8/1934 | Schutt | 62/260 |
| 2,563,262 | 8/1951 | Moore | 126/344 |
| 3,212,563 | 10/1965 | Schrader | 165/45 |
| 3,451,553 | 6/1969 | Davis | 210/170 |
| 3,607,737 | 9/1971 | Gamer et al. | 210/12 |
| 3,892,660 | 7/1975 | Romell | 210/12 |
| 3,907,682 | 9/1975 | Basseet | 210/187 X |
| 4,184,856 | 1/1980 | Thoren | 55/52 |
| 4,476,921 | 10/1984 | Stubbole | 165/45 X |
| 4,565,161 | 1/1986 | Choquette | 62/238.7 X |
| 5,104,542 | 4/1992 | Dixon et al. | 210/532.2 |
| 5,295,473 | 3/1994 | Neufeldt | 165/166 X |
| 5,473,907 | 12/1995 | Briggs | 62/238.7 |

FOREIGN PATENT DOCUMENTS

| | | | |
|---|---|---|---|
| 2702558 | 7/1978 | Germany | 165/47 |
| 2952780 | 7/1981 | Germany | 165/909 |
| 3813669 | 12/1989 | Germany | 62/238.7 |
| 0105633 | 7/1982 | Japan | 165/45 |
| 4366372 | 12/1992 | Japan | 62/260 |
| 48893 | 5/1921 | Sweden | |
| 78757 | 2/1919 | Switzerland | |
| 1236272 | 6/1986 | U.S.S.R. | 62/260 |

*Primary Examiner*—John Rivell
*Assistant Examiner*—Christopher Atkihson
*Attorney, Agent, or Firm*—Bereskin & Parr; Timothy J. Sinnott

[57] ABSTRACT

Apparatus for exchanging heat between biothermal and geothermal ground heat sources and a heat pump for a building comprises a tank having a chamber for holding septic waste underground. The tank includes a heat conductive inner membrane for transferring heat to and from the waste. A fluid jacket located outside the chamber passes a heat transfer fluid adjacent a portion of the inner surface of the tank. Waste entry and exit piping transfers the waste to and from the chamber. Fluid inlet piping and outlet piping supplies the heat transfer fluid to and from the heat pump and the fluid jacket. When coupled to a heat pump in the heating mode, heat transfer fluid absorbs heat from biothermal sources within the tank and geothermal sources in and around the tank. In the cooling mode, heat transfer fluid conducts heat from a building to the tank and ground.

20 Claims, 2 Drawing Sheets

BIOTHERMAL AND GEOTHERMAL HEAT EXCHANGE APPARATUS FOR A GROUND SOURCE HEAT PUMP

FIELD OF THE INVENTION

The present invention relates to heat exchange devices for heat pumps, and more particularly to an apparatus for exchanging heat between ground heat sources and a heat pump.

BACKGROUND OF THE INVENTION

Heat pumps provide an efficient source of heat for buildings by extracting heat from the outside environment and pumping it into the interior of a building. The heat from the heat pump can be used to heat air and water for domestic use. Heat pumps can also act as efficient air conditioners by reversing the heat pump cycle and pumping heat from a building into the outside environment.

There are two common types of heat pumps. Heat pumps which extract heat from the outside air are known as "air source" heat pumps, and those that extract geothermal heat from the ground are known as "ground source" heat pumps. The present invention relates to ground source heat pumps.

There are a number of ways in which a ground source heat pump extracts heat from the ground. An "open loop" type system utilizes a continuous source of ground water which is circulated through the heat pump and then discharged away from the ground water source into another well, pond or river. This system, also referred to as a water source heat pump, requires a large reservoir of water rarely available in urban sites and often not in rural sites. Open loop heat pumps also sometimes create environmental problems including depleting water tables, and disturbing natural surface water runoff patterns.

A "closed loop" heat pump system uses a heat transfer fluid circulated through continuous loops of piping buried beneath the ground to capture the heat from the surrounding soil. The piping can be arranged in horizontal loops three to six feet beneath the ground, or in vertical loops inserted into bore holes drilled to depths of 60 to 200 feet.

A major obstacle in the greater implementation of ground source heat pumps is their initial high capital cost relative to conventional gas, oil or electric heating furnaces. A major portion of the cost (up to 45%) of a ground source heat pump is the installation of the ground loop piping. There is accordingly a need for less expensive or more efficient ground source heat pumps.

The efficiency of a ground source heat pump is determined by a number of factors, including the temperature differential between the heat transfer fluid and the ambient ground temperature. In the heating mode, the higher the ambient ground temperature, the more efficient the heat transfer to the heat transfer fluid. Increasing the heat transfer efficiency permits the use of shorter ground loops, which reduces installation costs, or operating costs or both.

U.S. Pat. No. 2,563,262 by Moore, discloses an apparatus to improve the heat transfer efficiency of a ground source heat recovery system. A ground loop is placed inside a septic tank and extended through an adjacent tile bed to absorb heat from the septic waste stream and the ground below the tile bed. However the need to install the coil looping inside the septic tank and also in the tile bed gives rise to corrosion problems. This system is also expensive and relatively complicated.

SUMMARY OF THE INVENTION

The present invention relates to apparatus for exchanging heat between biothermal and geothermal ground heat sources and a heat pump for a building. The subject apparatus comprises holding means for holding septic waste underground, fluid passage means for passing a heat transfer fluid, waste transfer means, and fluid supply and discharge means.

The holding means has a heat conductive inner surface which forms a chamber for holding the septic waste underground. Fluid passage means located outside the chamber passes a heat transfer fluid adjacent a selected portion of the inner surface of the holding means. The waste transfer means transfers the waste to and from the chamber. The fluid supply means supplies the heat transfer fluid from the heat pump to the fluid passage means and the fluid discharge means discharges the heat transfer fluid from the fluid passage means to the heat pump.

The fluid passage means preferably has a heat conductive outer surface spaced from the inner surface and a fluid passageway located therebetween. The holding means may comprise a septic holding tank having an inner membrane adapted to transfer heat between the fluid and the waste. The inner membrane preferably comprises the side walls and bottom of the tank. The fluid passage means may comprise a heat conductive outer membrane spaced from the inner membrane of the holding tank, the spaced membranes together form an exterior fluid jacket defining a fluid passageway around a selected portion of the chamber.

The fluid passage means may also comprise an interior fluid jacket located within the holding tank having a passageway in fluid communication with the exterior fluid jacket. This interior fluid jacket may take the form of a vertically extending double-wall hollow partition separating the chamber into two sub-chambers, or one or more laterally extending baffles.

BRIEF DESCRIPTION OF THE DRAWINGS

The invention will now be described by way of example only, with reference to the following drawings, in which.

DESCRIPTION OF THE PREFERRED EMBODIMENT

Figure 1:
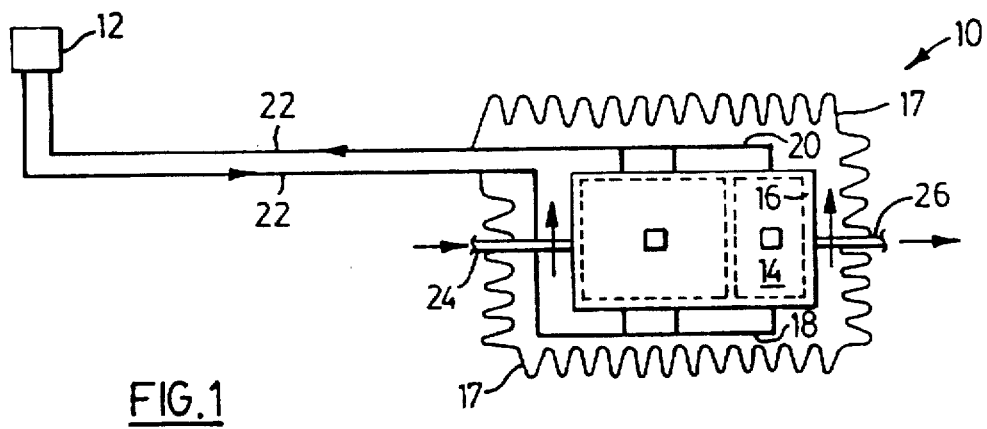
FIG. 1 is a schematic view of a heat exchange apparatus for a ground source heat pump system, made in accordance with the subject invention.

FIG. 1 illustrates a preferred embodiment of a heat exchange apparatus made in accordance with the subject invention, coupled to a ground source heat pump. Heat exchange apparatus shown generally as 10 comprises septic holding tank 14 having fluid passage means 16 coupled to heat pump 12 by inlet piping 18 and outlet piping 20 containing heat transfer fluid 22. Heat exchange apparatus 10 may also include auxiliary pipe coil 17 for additional heat transfer capacity.

Figure 2:
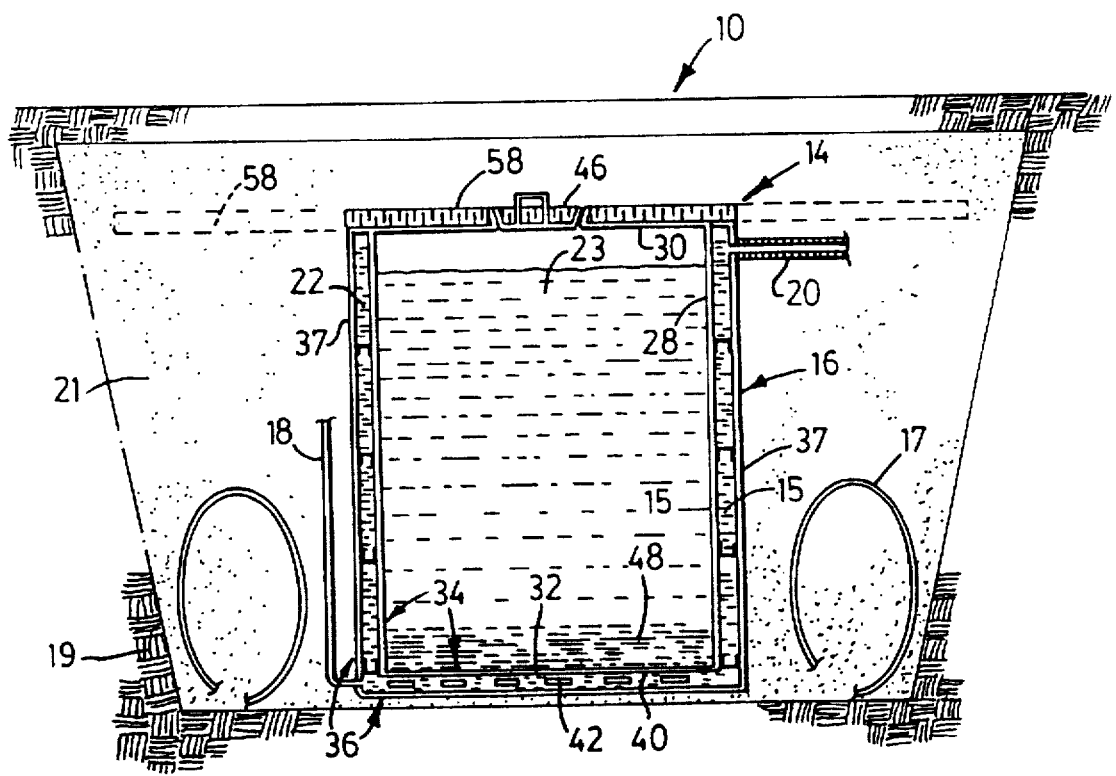
FIG. 2 is a cross-sectional end view of a preferred embodiment of the subject invention.
Figure 3:
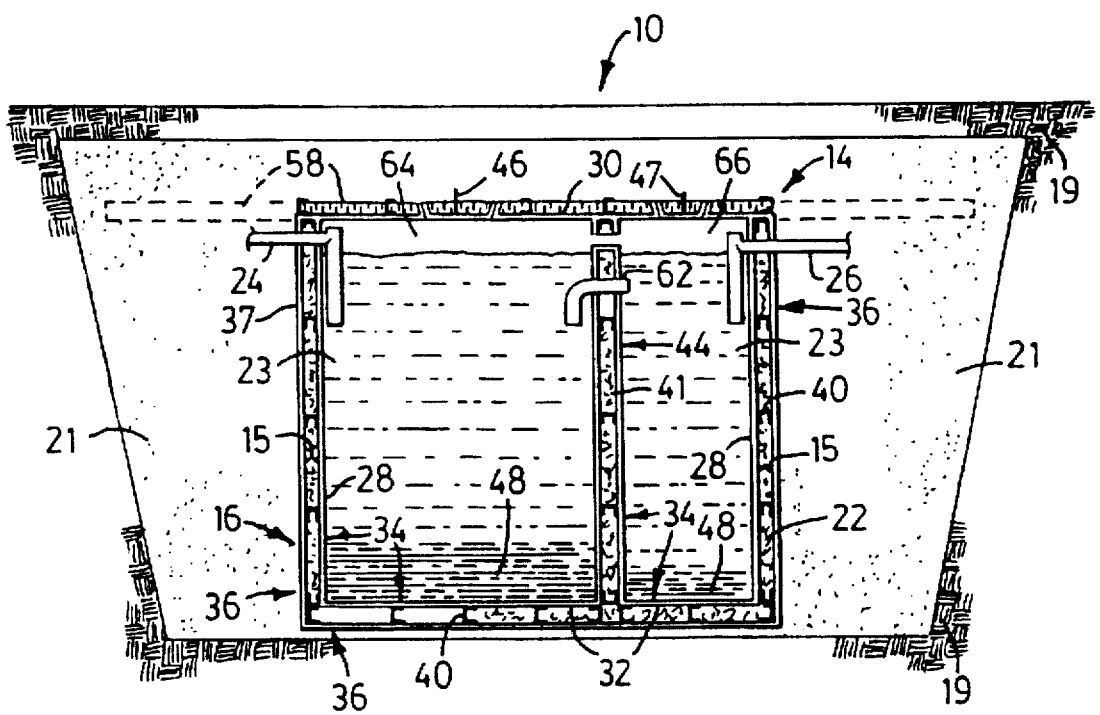
FIG. 3 is a cross-sectional side view of the preferred embodiment of the heat exchange apparatus.

Referring now to FIGS. 2 and 3, heat exchange apparatus 10 is preferably mounted in a hole in ground 19 partially backfilled with granular fill 21. Tank 14 containing waste 23 comprises a top 30, and inner membrane 34 composed of vertical side walls 28 and bottom 32. Waste 23 including grey water and liquid and solid septic waste is pumped or gravity fed into tank 14 via waste entry piping 24. Septic tank 14 separates waste 23 into liquid and solid components and allows decomposition and settling while within tank 14. The liquid component exits tank 14 via waste exit piping 26 to a sanitary sewer or a tile bed (not shown).

Fluid passage means 16 comprises outer membrane 36 in the form of outer wall 37, spaced from inner membrane 34. Spaced inner and outer membranes 34, 36 together define an exterior fluid jacket 15 which defines a passageway for heat transfer fluid 22.

Membranes 34 and 36 are made of heat conductive materials impervious to fluids and solids i.e. materials adapted to transfer heat to the heat transfer fluid. Such materials include fibreglass, plastics, copper, steel, coated or galvanized steel, aluminum, and concrete, as the material need not necessarily be an excellent heat conductor. The choice of heat conductive material reflects a balancing of cost, strength, corrosion resistance and heat conductivity.

Fluid passage means 16 contains heat transfer fluid 22 which is circulated through and enters fluid passage means 16 through inlet piping 18 located near bottom 32 of tank 14 and exits through outlet piping 20 near top 30 of tank 14. Fluid 22 may be composed of water, antifreeze or other suitable liquids for use in heat pumps including but not limited to ethylene glycol. Heat is transferred to and from waste 23 through inner membrane 34 to heat transfer fluid 22. Similarly, heat is transferred to and from ground 19 or fill 21 through outer membrane 36 to heat transfer fluid 22.

As best shown in FIG. 3, fluid passage means 16 preferably includes an interior fluid jacket in the form of a double wall vertical partition 44 which divides tank 14 into inlet sub-chamber 64 and outlet sub-chamber 66. Partition 44 has a passageway 41 in fluid communication with exterior fluid jacket 15. This allows fluid 22 to circulate through passageway 41, thereby increasing the surface area for capturing heat from waste 23. Partition 44 may also include a conduit 62 for the transfer of waste 23 through an upper portion of partition 44.

Rigid spacers 40, preferably plate-shaped and provided with apertures 42 (see FIG. 2) are connected to inner and outer membranes 34, 36. Spacers 40 may also be connected between the walls of partition 44. Spacers 40 maintain the distance between membranes 34, 36 and the walls of partition 44.

Top 30 seals off tank 14 and has access ports 46, 47 for manual removal of solids 48 which settle onto bottom 32 over time. Top 30 is preferably insulated with rigid insulation 58 to minimize heat loss through top 30. Fine granular fill 21 is used as backfill around tank 14 in order to improve the heat transfer efficiency from fill 21 to outer membrane 36.

As shown in FIGS. 1 and 2, optional pipe coil 17 may be imbedded in fill 21 around tank 14 to augment the heat transfer capacity of heat exchange apparatus 10. Pipe coil 17 is in fluid communication with fluid passage means 16 at inlet piping 18 and also at outlet piping 20 such that heat transfer fluid 22 circulates through coil pipe 17.

Figure 4:
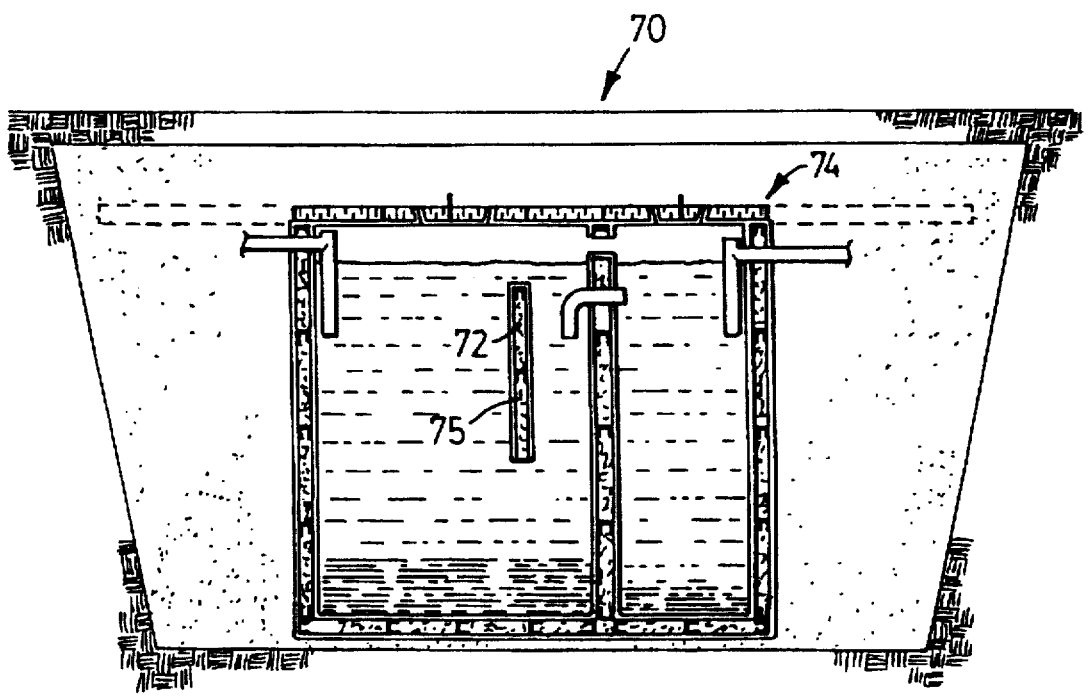
FIG. 4 is a side cross-sectional view of an alternative embodiment of the invention showing an optional internal baffles.

Referring now to FIG. 4, in an alternative embodiment of the invention, interior fluid jacket also takes the form of a double-wall baffle 72 extending laterally across tank 74. Baffle 72 includes a fluid passageway 75 in fluid communication with exterior fluid jacket 15, which is similar to passageway 41 of partition 44. Baffle 72 may be partially or totally submerged in waste and in various locations throughout tank 74. Baffle 72 may be spaced from the bottom or top of tank 74 depending on the number of baffles needed to control the flow of waste through tank 74 to ensure adequate settling of solids.

The subject invention preferably includes a temperature control which limits the temperature of waste 23 to a minimum of 35° F. to prevent freezing. The distance between inner membrane 34 and outer membrane 36 can vary but is preferably between about ½" to about 6".

In use in the heating mode, heat transfer fluid 22 circulating in fluid passage means 16 absorbs heat passing through inner membrane 34 from waste 23. Biothermal heat may be present from warm waste water entering tank 14, or from heat generated during the decomposition of waste 23. Heat transfer fluid 22 also absorbs geothermal heat through outer membrane 36 from ground 19 or fill 21 adjacent outer membrane 36. Heat transfer fluid 22 enters fluid passage means 16 via inlet piping 18 located near the bottom of fluid transfer means 16 and exits via outlet piping 20 near the top of fluid transfer means 16. This arrangement aids the natural convection path of fluid 22. Heat transfer fluid 22 is circulated to heat pump 12 where heat is extracted from fluid 22. In the cooling mode, heat pump 12 operates in reverse. Heat transfer fluid 22 conducts heat to waste 23 through inner membrane 34 and also to ground 19 or fill 21 through outer membrane 36.

The exothermic reaction of anaerobic bacteria in waste 23 and also the latent heat in the incoming stream creates warm temperatures within tank 14 thereby improving the efficiency of the ground source heat transfer to heat transfer fluid 22 relative to conventional ambient ground sources. For example, a 8 ft deep by 6 ft wide by 8 ft long tank 14, with one partition 44 separating inlet subchamber 64 from outlet sub-chamber 66 would produce the same amount of heat transfer surface area as 4,400 lineal ft. of ¾ inch diameter pipe. In addition to providing a large heat exchange surface area, the heat exchange efficiency is also improved since the temperature differential between waste 23 and fluid 22 is greater than the temperature differential between ground 19 and fluid 22 in conventional closed loop systems.

The increased efficiency of the subject apparatus can be understood by considering a small column or portion of liquid as it travels through a conventional closed loop pipe system. At the beginning of the loop, the difference in temperature between this column of liquid and the surrounding earth temperature is at its maximum, therefore providing a high efficiency of heat transfer. As this column of liquid progresses down the loop, it absorbs heat, and its temperature rises. As the differential temperature between the column of liquid and the surrounding earth decreases, the heat transfer efficiency also decreases. By the time this column of liquid reaches the end of the loop system, the differential temperature and efficiency is very minimal. In this invention the heat exchange mechanism is equivalent to several thousands of the liquid columns, simultaneously exchanging heat, all at the highest efficiency rate. This invention is accordingly believed to be particularly efficient in absorbing both geothermal energy and biothermal energy.

It should also be appreciated that the use of the subject apparatus by households with access to sanitary sewers would significantly reduce the treatment load on sewage treatment plants, given that about 70% of the sewage treatment takes place in conventional septic holding tanks.

While in the preferred embodiment of the subject invention, the fluid passage means comprises a double wall water jacket, alternatives configurations are possible. For example, tank 14 may comprise a thick concrete wall imbedded with piping creating a fluid passageway, or piping could be wrapped around the exterior of inner membrane 34. However these embodiments may not have all of the advantages associated with the preferred embodiment.

It should accordingly be apparent to persons skilled in the art that various modifications and adaptations of the structure described above are possible without departure from the spirit of the invention, the scope of which is defined in the appended claims.

I claim:

1. Apparatus for exchanging heat between biothermal and geothermal ground heat sources and a heat pump for a building, comprising:
   (a) holding means for holding septic waste underground having a heat conductive inner surface forming a chamber;
   (b) fluid passage means located outside the chamber for passing a heat transfer liquid adjacent a selected portion of the inner surface of the holding means comprising a heat conductive outer surface spaced from the inner surface, and a fluid passageway located therebetween;
   (c) waste transfer means for transferring the waste to and from the chamber;
   (d) fluid supply means for supplying the heat transfer liquid from the heat pump to the fluid passage means; and
   (e) fluid discharge means for discharging the heat transfer liquid from the fluid passage means to the heat pump.

2. The apparatus as defined in claim 1, wherein the holding means comprises a septic holding tank having an inner membrane adapted to transfer heat between the fluid and the waste.

3. The apparatus as defined in claim 2, wherein the holding tank has vertical side walls, a horizontal bottom and a top, and the inner membrane comprises the side walls of the tank.

4. The apparatus as defined in claim 3, wherein the inner membrane also comprises the bottom of the tank.

5. Apparatus for exchanging heat between biothermal and geothermal ground heat sources and a heat pump for a building, comprising:
   (a) holding means for holding septic waste underground, comprising a septic holding tank having a chamber for holding the waste formed by an inner membrane made from a material capable of conducting heat from the waste;
   (b) fluid passage means located outside the chamber for passing a heat transfer liquid adjacent a selected portion of the inner membrane of the holding means, comprising, an outer membrane spaced from the inner membrane of the holding tank, the outer membrane being made from a material capable of transferring heat between the liquid and the ground, the spaced membranes together forming an exterior fluid jacket defining a fluid passageway around a selected portion of the chamber;
   (c) waste transfer means for transferring the waste to and from the chamber;
   (d) fluid supply means for supplying the heat transfer liquid from the heat pump to the fluid passage means; and
   (e) fluid discharge means for discharging the heat transfer liquid from the fluid passage means to the heat pump.

6. The apparatus as defined in claim 5, wherein the outer membrane comprises a vertical outer wall spaced from the side walls of the tank.

7. The apparatus as defined in claim 6, wherein the outer membrane also comprises a horizontal outer wall spaced from the bottom of the tank.

8. The apparatus as defined in claim 5, wherein the fluid passage means also comprises an interior fluid jacket located within the holding tank having a passageway in fluid communication with the exterior fluid jacket.

9. The apparatus as defined in claim 8, wherein the interior fluid jacket comprises a vertically extending double-wall hollow partition separating the chamber into two sub-chambers.

10. The apparatus as defined in claim 8, wherein the interior fluid jacket comprises a double-wall hollow baffle extending laterally across the chamber, and spaced from the bottom thereof.

11. The apparatus as defined in claim 3, wherein the chamber is rectangular.

12. The apparatus as defined in claim 5, wherein the fluid passage means comprises spacing means extending between the inner and outer membranes for maintaining the spacing there between.

13. The apparatus as defined in claim 12 wherein the spacing means comprises rigid spacers with apertures therein to facilitate passage of the heat transfer fluid.

14. The apparatus as defined in claim 1, wherein the supply means comprises inlet piping with an inlet connected to a bottom portion of the fluid passage means.

15. The apparatus as defined in claim 1, wherein the discharge means comprises outlet piping with an outlet connected to a top portion of the fluid passage means.

16. The apparatus as defined in claim 1, wherein the transfer means comprises entry piping and exit piping for ingress and egress of the waste from the chamber.

17. The apparatus as defined in claim 2, wherein the holding tank comprises an insulated top having an access port for manual removal of solids.

18. The apparatus as defined in claim 6, further comprising auxiliary exchange means for transferring heat between the building and ground heat sources adjacent the waste holding means.

19. The apparatus as defined in claim 18, wherein the auxiliary exchange means comprises a pipe coil spaced from and extending around the outer membrane of the tank adapted to be buried in fill around the tank, the pipe coil in communication with the fluid supply means and the fluid discharge means such that the heat transfer fluid circulates through the coil of pipe.

20. The apparatus as defined in claim 6, wherein the inner membrane and outer membrane are made from a material falling within a group of materials comprising concrete, copper, steel, coated steel, aluminum, fibreglass, and plastic.

* * * * *